United States Patent [19]

Wood

[11] Patent Number: 4,997,504

[45] Date of Patent: * Mar. 5, 1991

[54] METHOD AND APPARATUS FOR HIGH SPEED POUCH AND BAG MAKING

[76] Inventor: James R. Wood, 103 Bedford Park Ave., Toronto, Ontario, Canada, M5M 1J2

[*] Notice: The portion of the term of this patent subsequent to Jul. 18, 2006 has been disclaimed.

[21] Appl. No.: 380,510

[22] Filed: Jul. 17, 1989

Related U.S. Application Data

[63] Continuation-in-part of Ser. No. 96,309, Sep. 9, 1987, Pat. No. 4,849,040, which is a continuation of Ser. No. 930,060, Nov. 12, 1986, abandoned, which is a continuation of Ser. No. 743,743, Jun. 12, 1985, abandoned, which is a continuation-in-part of Ser. No. 212,219, Dec. 2, 1980, Pat. No. 4,566,927, which is a continuation of Ser. No. 949,670, Oct. 10, 1978, abandoned.

[51] Int. Cl.$^5$ .................. B29C 65/14; B32B 31/08; B32B 31/12

[52] U.S. Cl. .................. 156/204; 156/260; 156/269; 156/275.3; 156/275.5; 156/275.7; 156/277; 156/291; 156/379.8; 156/384; 156/465; 156/512; 156/548; 156/549; 493/188; 493/231; 493/266; 493/333; 493/335; 493/337; 493/933

[58] Field of Search ............ 156/204, 227, 259, 260, 156/275.3, 275.5, 275.7, 277, 291, 379.8, 384, 461, 465, 512, 548, 549; 493/332, 333, 933, 936, 188, 231, 264, 266, 335, 337

[56] References Cited

U.S. PATENT DOCUMENTS

| | | | |
|---|---|---|---|
| 3,655,476 | 4/1972 | Siegal | 156/260 |
| 3,660,217 | 5/1972 | Kehr et al. | 156/275.5 |
| 3,776,798 | 12/1973 | Milano | 156/291 |
| 4,100,311 | 7/1978 | Nablo et al. | 156/275.5 |
| 4,119,479 | 10/1978 | Williams, Jr. et al. | 156/275.5 |
| 4,246,297 | 1/1981 | Nablo et al. | 156/275.5 |
| 4,849,040 | 7/1989 | Wood | 156/204 |

Primary Examiner—Michael G. Wityshyn
Attorney, Agent, or Firm—Dowell & Dowell

[57] ABSTRACT

A method and apparatus for high speed pouch or bag making from thin, extensible heat-sensitive thermoplastic film webs in which the method is applied to a continuously moving web and sealing is achieved at temperatures below the softening temperatures of the film or sealing interfaces. The method of forming an open pouch comprising the steps of continuously pulling an elongated web of pouch forming material at a constant speed along a pouch making path which extends continuously through a web slitting station, a web coating station, a web collating station, an Electron Beam curing station and a web cutting station. An elongated web is slit into first and second webs at the slitting station, a pattern of E.B. curable adhesive is applied to a first surface of the first web as it is pulled continuously through the web coating station to render the first surface bondable at a seal pattern and non-bondable in the area of the storage compartment when subjected to Electron Beam radiation. The second web is directed into a face-to-face relationship with the first surface of the first web in the collating station, the collated webs are pulled through the E.B. curing station and irradiated with E.B. radiation to bond without heat distortion the bondable areas of the webs while leaving the non-bondable areas free from securement, and pouches are cut from the bonded webs.

9 Claims, 9 Drawing Sheets

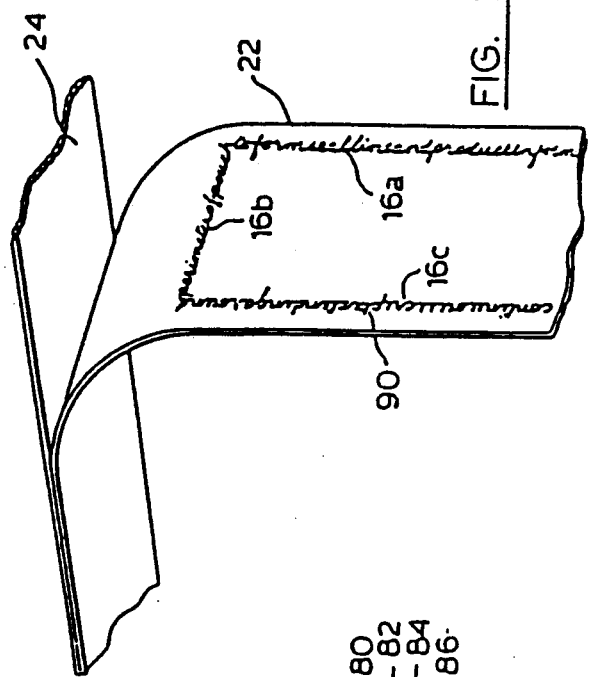
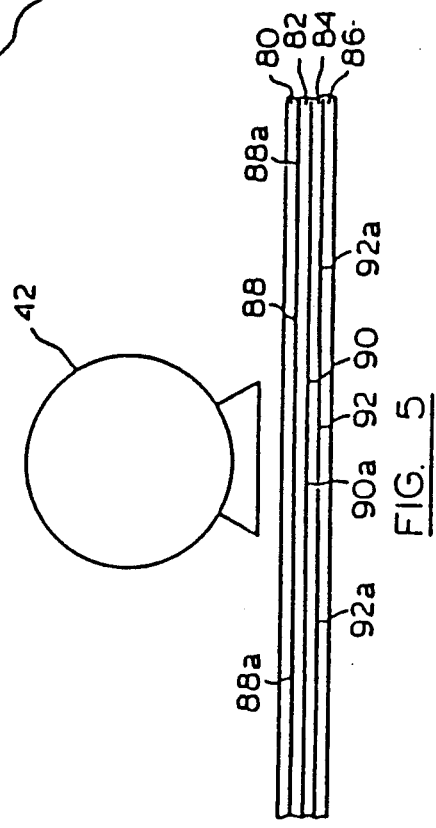
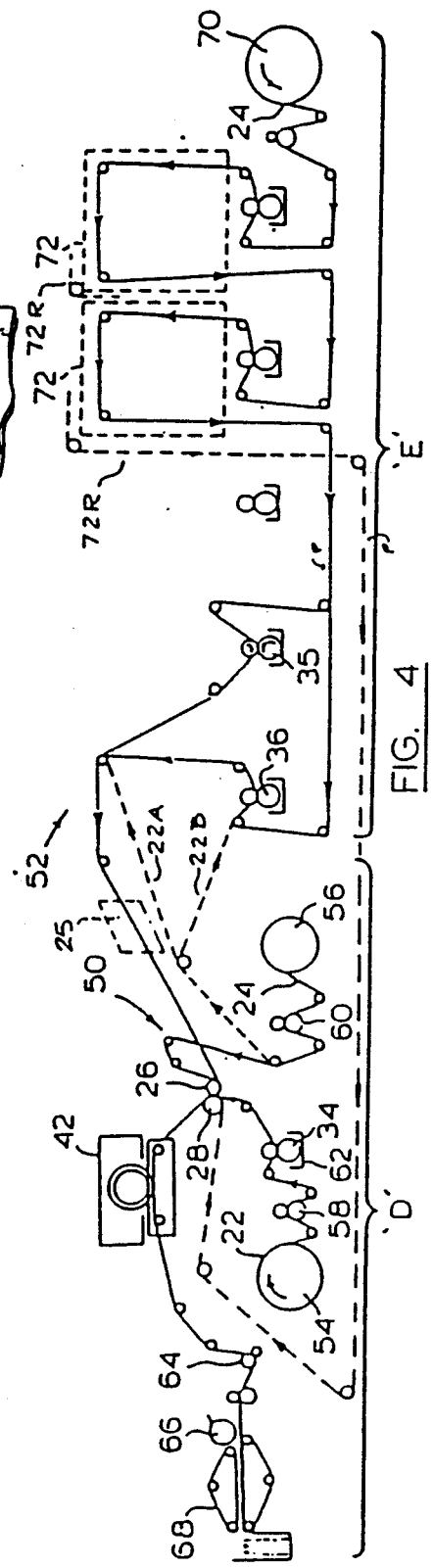

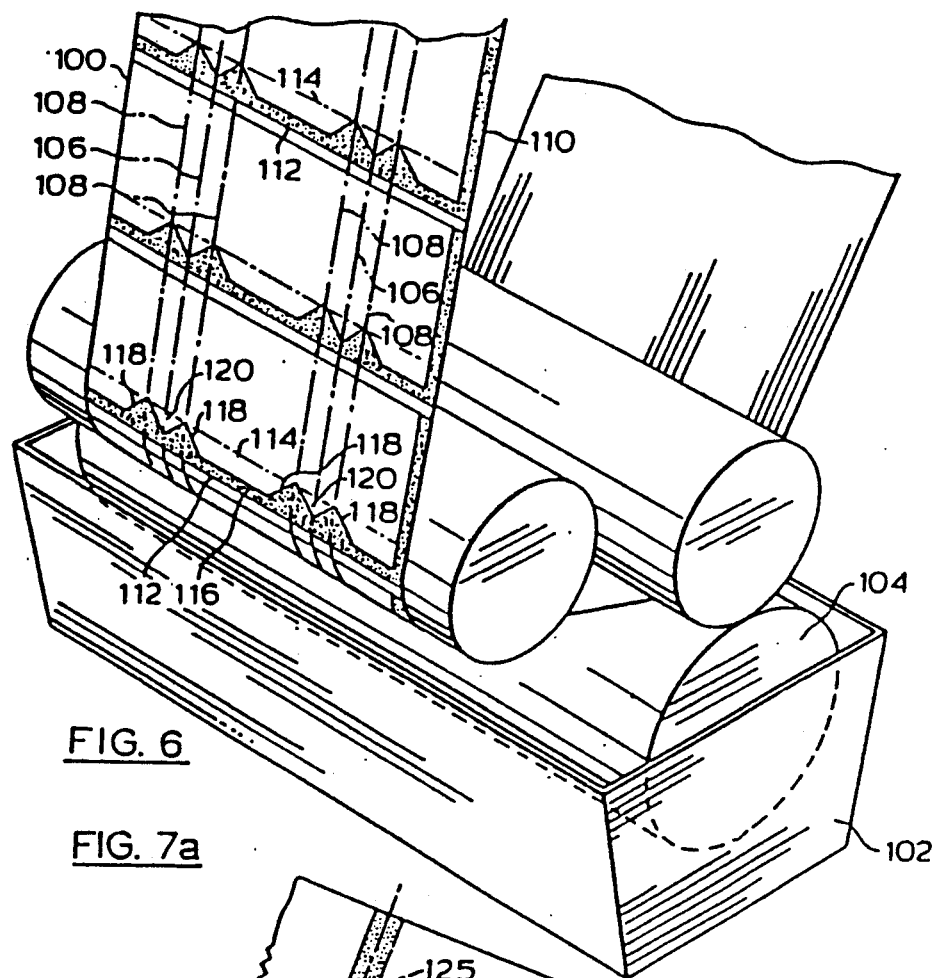
FIG. 6
FIG. 7a
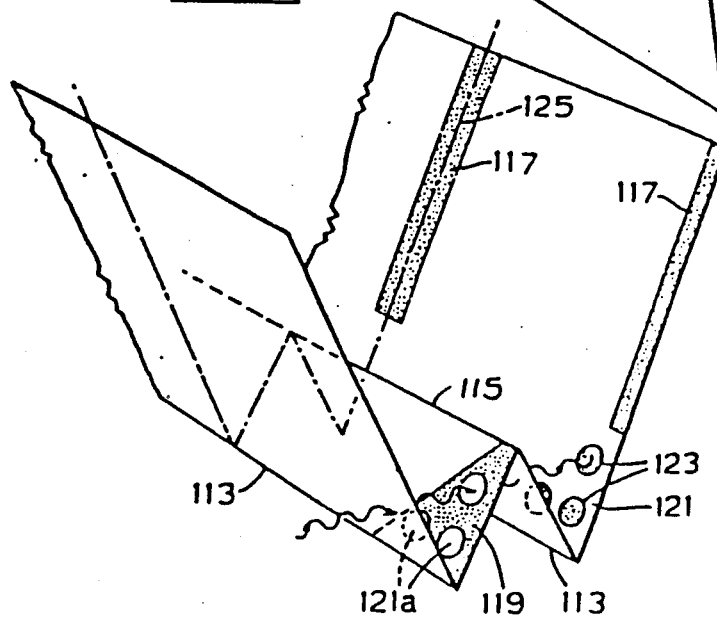

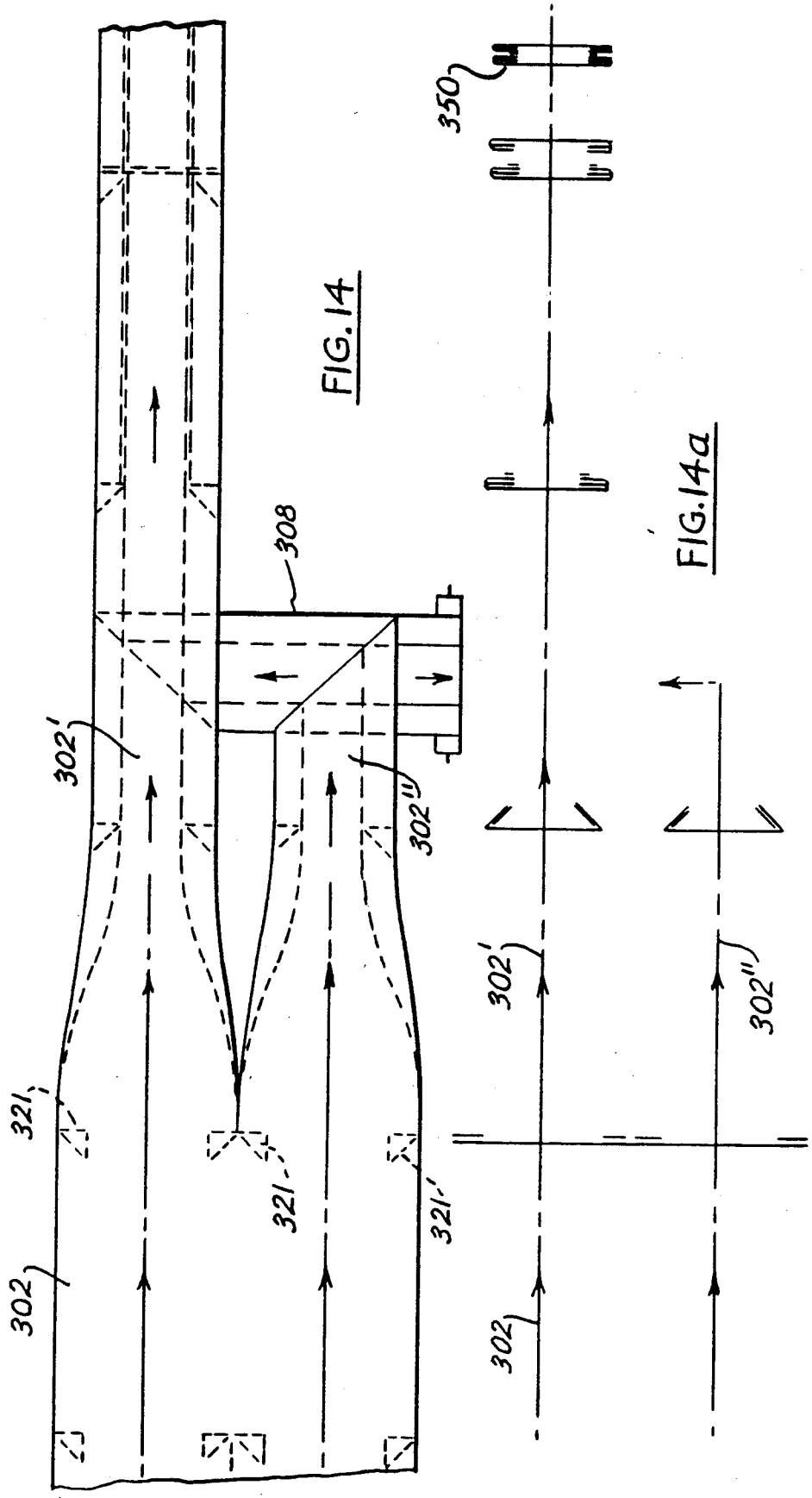

METHOD AND APPARATUS FOR HIGH SPEED POUCH AND BAG MAKING

RELATED APPLICATIONS

This application is a continuation-in-part of U.S. Ser. No. 96,309 filed Sept. 9, 1987, now U.S. Pat. No. 4,849,040 which is a continuation of U.S. Ser. No. 930,060 filed Nov. 12, 1986, now abandoned, which is a continuation of U.S. Ser. No. 743,743 filed June 12, 1985, now abandoned, which is a continuation-in-part of U.S. Ser. No. 212,219 filed Dec. 2, 1980, now U.S. Pat. No. 4,566,927, which is a continuation of U.S. Ser. No. 949,670 filed Oct. 10, 1978, now abandoned.

FIELD OF THE INVENTION

This invention relates to a high speed method and apparatus for making pouches, bags and the like.

HISTORY OF THE RELATED ART

Presently in the packaging industry pouches and bags are made on conventional machines by heat sealing side seams and bottom seams or glue sealing these seams. In the heat sealing machines which are presently in wide use, electrically heated heater bars shaped to the pattern of the seal to be made are pressed into physical contact against the webs which are to be sealed with a production output limiting dwell time being required for conduction of heat through the webs to their sealing interface to effect a seal.

In the glue sealing machines which are widely used in industry and which are manufactured by a large number of different machine makers, glues suitable for paper, film or foil are applied in patterns for the side seams and bottom closure.

Production outputs are limited by the mechanical applicator's maximum frequency and the "green-tack" time for the glue to "bite" and hold the glue interfaces together before the bags are delivered from the bag machine and pressure packed in bundles allowing the glue to slowly lose its solvent or aqueous components and permanently set.

The average output in bags per minute ranges from 60 to 200 in the case of the heat seal machines and from 100 to 1000 per minute in the glue seal machines. The norms are 125 and 200 per minute, respectively. All of these machines require mechanical set-up time for change of bag size with various change of size parts. With some square bottom bag machines, a series of machine sizes are made to cover the range of bag sizes due to the mechanical complexity of parts and adjustments being too great to be accommodated in one machine.

In the heat seal machines extensible heat sensitive thermoplastic webs such as polyethylene film present limitations in the type of construction for the pouch or bag due to the heat weakening of the web by a ⅛" to ¼" wide heat seals across the web at right angles to web motion. This allows only "side-weld" bags to be made or necessitates web transport means to support the "jelly-like" condition of the transverse seal area until it cools and recovers sufficient tensile strength to resist the normal machine operating web tension.

The majority of bags and pouches printed today such as cookie bags, dog food bags, cake mix and crystal pouches, etc., have high quality graphics usually in rotogravure printing. This necessitates the pouch and bag making to be a separate operation from the printing operation. The "print-and-make" bag making in-line operations are usually in the relatively lower quality flexographic printing and limited to the lower web speed of bag making which is in the order of 100 to 200 feet per minute vs 600 to 1000 feet per minute in modern flexographic and rotogravure presses. Also modern flexographic and rotogravure press widths usually allow the pouch or bag web to be printed two, three, four or more wide and slit into single roll widths for the pouch or bag machine. This increases the printing output six to ten times that of the in-line "print-and-make" bag method, provides superior quality half tone printing and the viable economics of one $2,000,000 rotogravure press output matching the total output of three or four $300,000 pouch or bag machines. The first printed bags, where the printing was held in register on the bag face or to the bag machine cut-off, were by necessity produced with a tail end printer in line with the bag machine (print-and-make method) and driven by a "one-time-side-drive-shaft" from the bag machine i.e. one revolution of the printing cyclinder or printing impression per one cut-off of the bag machine. The printed repeat or impression length was pre-selected to exactly match the bag machine cut-off length and register variations caused by web tension changes were manually controlled by the operator adjusting a compensating web roll situated between the tail end printer and the bag machine which would lengthen or shorten the web path between the printer and bag machine causing the print to arrive at the cut-off knife later or sooner respectively and thus move down or up to register the bag cut off line. This method is slow and waste is high both related to the skill of the operator in watching the printed web and making the correct compensator roll adjustment at the right moment and in the right amount.

A great improvement occurred in the 1930's with the development of electronic register control for bag machines allowing the compensator roll to be automatically adjusted, or the bag machine pull rolls through a differential drive to be automatically slowed down or speeded up while in continuous motion. This development also allowed preprinted off line webs to be made into pouches and bags keeping the printing in register to the pouch or bag face and to the cut off knife cut line. The control being photo cell activated by a web "lay-mark" usually a small black rectangle about ⅛" wide in machine direction by ½" long across machine direction which was pre-printed on the web, usually at the edge of the web or in the area of the bottom closure folds to be hidden from sight in the final bag, in an off line printing operation. This development improved the printing quality on bags, reduced waste and allowed printed bags to be made at increased speeds previously limited by operator skill and human error. However, the pouch and bag machine speeds are still limited by the inherent frequency limitations of mechanical moving parts, particularly opening and closing mechanisms for the application of adhesive glues or heater jaw actuation for seal patterns and areas in thermo-sealed seams and closures. The majority of heat seal pouch and bag machines have time consuming intermittent web motion or a series of mechanical heat sealing stations to provide sealer bar web contact dwell time in the order of 0.50 second to allow heat transfer from the high temperature sealer bar surface through the web to the sealing interface. Also, considerable bag machine down time, skilled labour and waste is encountered at each "set up" of a glue or heat seal machine for a pouch or bag of different size to be made within the limited size range of each machine. Also, expensive change of size parts are often required for each pouch or bag size the machine is to produce. With the steadily rising costs of new and physically improved pouch and bag materials in papers, films and foils, increasing labour rates and capital cost of pouch and bag machines the packaging industry in this area is operating at 1950 outputs, unit costs and qualities in the 1980 higher quality and efficiency demanding market place.

The use of adhesives to overcome the above limitations of heat sealing in the manufacture of pouches or bags from single wall heat sensitive thin thermoplastic films such as polyethylene or substrates with the thermoplastic coatings is counter productive because the barrier qualities of the films or coatings prevent the rapid escape of the solvent or aqueous components of the adhesives necessary to effect a high speed strong seal.

SUMMARY OF THE INVENTION

According to one aspect of the present invention there is provided, an apparatus for forming an open pouch from thin gauge extensible heat sensitive thermoplastic film, the pouch consisting of two panels which are secured to one another along a wide ($\frac{1}{4}$" to $\frac{1}{2}$") seal line which extends about an article storage compartment located between said two panels and which is open along an opening line extending between opposite ends of the seal line, the apparatus comprising; means for continuously pulling first and second webs through said apparatus, at least one printing press arranged in line with at least one of said webs for applying printing to the first surface of a web passing therethrough, rotogravure applicator means arranged in line with at least one of said webs for applying a pattern of an E.B. curable adhesive to a portion of a second surface of said printed web to render it bondable along a line having the configuration of said seal line and second portions therof non-bondable in the area of said first web to be used in forming said articles storage compartment, collating means arranged in line with said webs for collating said first and second webs in an overlying relationship with said second surface in intimate contact with the second web at an interface, Electron Beam curing station arranged in line and at 90° to the web motion with said webs, said Electron Beam curing station from which an Electron Beam curtain is emitted across the full web width, said intimate contacting webs moving through said curing station whereby the penetrating Electron Beam irradiates the buried E.B. curable adhesive at the interface by directing radiation through the first web to reach the interface surfaces and thereby instantaneously bond the bondable portions of the webs together in the pattern; and slitting and cut off means arranged in line with said webs for slitting apart ribbons of pouches then cutting off individual pouches from said ribbons, while in continuous motion, effecting a cut line extending about the periphery of the article storage compartment of each pouch, said line being disposed outwardly from the seal line and extending along said opening line to provide an open pouch.

According to a further aspect of the present invention there is provided, a high speed print and make method of forming an open pouch from two webs of extensible heat sensitive thermoplastic material having a thickness in the range of less than 0.001 up to 0.008", the pouch consisting of two panels which are secured to one another along a seal line which extends about an article storage compartment located between two panels and which is open along an opening line extending between opposite ends of the seal line, the method comprising the steps of; pulling at least one of said first and second webs of extensible heat sensitive thermoplastic material through at least one printing press at speeds of 300' to more than 600' per minute and applying printing to the first surface of the web passing through said press, pulling at least one of said first and second webs of extensible heat sensitive thermoplastic material through a rotogravure applicator means at synchronous speed to the web passing through said printing press and applying a pattern of an E.B. curable adhesive to a portion of the second surface of said printed web to render it bondable along an area having the configuration of said seal pattern and second portions thereof non-bondable in the area of said first web to be used in forming said article storage compartment, pulling said first and second webs of extensible heat sensitive thermoplastic material through a web collator at synchronous speed to the web passing through said printing press and rotogravure applicator means to collate said first and second webs in an overlying relationship with said first web second surface in intimate contact with the secured web at an interface, pulling said collated first and second webs of extensible heat sensitive thermoplastic material, at synchronous speed to the webs pulled through said web collator, through an Electron Beam curing means having a curing station from which an Electron Beam curtain is emitted, whereby said Electron Beam irradiates the buried sealing interface by directing radiation through the first web to reach the E.B. curable adhesive patterns and thereby instantaneously bond said bondable portions of said webs together in said pattern; and pulling said bonded first and second webs of extensible heat sensitive thermoplastic material, at synchronous speed to the webs pulled through said Electron Beam curing means, through slitting and cut off means slitting apart ribbons of pouches and cutting off single pouches from said ribbons effecting a cut line extending about the periphery of the article storage compartment of each pouch, said line being disposed outwardly from the seal line and extending along said opening line to provide an open pouch.

According to yet a further aspect of the present invention, an apparatus and method for forming open bags from thin gauge webs of paper, film and foil materials is disclosed wherein the materials have thickness gauges up to approximately 0.008" wherein the forming is accomplished at temperatures below the heat sealing temperature of a 0.001" gauge thickness film of polyethylene. In the apparatus and method, means are provided for continuously pulling a single web of material through the apparatus at rates of up to and exceeding 600 feet per minute wherein the material is passed through a printing press arranged in line with the single web for applying ink printing to a first surface of the single web as it passes through the press. A film slitter for cutting the single film into first and second webs is also provided which may be spaced relative to a rotogravure coating means arranged in line with the first web for applying a sealing line pattern of 100% E.B. reactive and curable adhesive to a second surface of the first web with the sealing line pattern being in register with the ink printing applied to the first surface of the single web to thereby render the first and second webs bondable in the configuration of the sealing line pattern. The method and apparatus further provides for re-orienting and collating of the first and second webs so that the webs are in overlying relationship with the second surface of the first web being brought into intimate contact with the second surface of the second web so as to interpose the sealing line pattern at the interface of the first and second webs. Thereafter, the first and second webs are passed through an electron beam curing means which is operable to emit a curtain of electron radiation perpendicularly to and across the width of the collated webs so as to promote free-radical polymerization directly and instantly of the sealing line pattern of the 100% E.B. reactive and curable adhesive without the application of heat and at temperatures of the first and second webs below the sealing temperature of 0.001" polyethylene and wherein the curing is obtained in a single pass through the curing means. Thereafter, the webs are cut for further handling and storage.

According to another aspect of the invention, first and second webs which are slit from a single web material and are directed through a first and a second rotogravure coating means so that a first pattern of 100% reactive E.B. curable adhesive is applied to form side and bottom gussets for a square bottom bag and thereafter through a second coating means for the application of 100% reactive E.B. reactive and curable adhesive to form the seal lines for the exterior of the bag or pouch which is to be formed.

The present invention is directed to a method and apparatus for high speed heat seal like pouch and bag making which overcomes limitations in the present state of the art pouch and bag making by providing a method and apparatus to make high speed (in the order of 0.03 vs 0.50 seconds) strong seals on pouches or bags of single wall thin gauge heat sensitive extensible plastic films or substrates with moisture or solvent barrier laminations or coatings by the combination of 100% E.B. reactive curable adhesive, Electron Beam radiation and the absence of both heat and speed limiting mechanical apparatus.

To significantly increase the lineal web speed and output of heat seal like pouches and bags and to approach zero defect seal quality control, Electron Beam radiation is used for instantaneous cure sealing of webs to form pouches at extremely high speed. In particular, this use of E.B. radiation allows radical pouch and bag machine redesign eliminating the various reciprocating speed limiting devices and time consuming heat transfer and other sealing functions inherent in the current state of the art of heat sealing pouch and bag making machines. Also, the present art of two operations for pre-printing and pouch or bag making can be combined into one in line operation. The pouch and bag machine per se has been eliminated and only its free flowing web folding and tube forming functions retained to be combined into a novel high speed single line pouch and/or bag making and printing machine consisting of rotogravure or flexographic printing units, E.B. curable adhesive rotogravure applicator unit, web folding and/or tube forming devices, and slitting units, E.B. radiating unit cut-off units.

This new high speed pouch bag and bag making machine can achieve lineal web speeds beyond 300 to 600 feet per minute with output rates exceeding 5,000 pouches per minute including simultaneous multi-colour rotogravure or flexographic printing. Near zero defect quality seal control is attained with the micron thickness laydown control of the electron beam curable adhesive by the rotogravure process in conjunction with the ELECTROCURTAIN (Trade Mark of Energy Sciences Inc., Woburn Mass., U.S.A.) Processor Control of the Electron Beam radiation exposure and penetration. The radiation can be preset on the Processor control panel and through a slave control of the grid drive the Processor output tracks the web throughput so the fixed present megarad exposure level is delivered regardless of the web speed. This simplifies start up and shut down problems, prevents web burn out, reduces waste and automatically maintains excellent quality control of pouch and bag seals.

The emitted electrons high velocity and high energy, close to the speed of light and up to 300,000 electron volts, from the E.S.I. Model EPZ-2 ELECTROCURTAIN of approximately 4 inches wide (Web direction) initiate a free radical addition polymerization in tens of milliseconds in the 100% EB curable pouch or bag printed adhesive seal patterns bonding these pouch or bag seals practically instantaneously while the webs are in continuous motion at web speeds up to and exceeding 600 feet per minute.

The electron beam radiation will penetrate opaque papers, metal aluminum foil and transparent or opaque films to instantly cure E.B. curable adhesive several plies below the incident surface as is necessary in this invention in the multi-layer folded bag bottom closures all sealed simultaneously and in the final folded flat attitudes. No other known technology Ultra Violet, Infrared, Ionization, etc. can deliver the over 50,000 fold greater energy of E.B. (UV=3 electron volts versus E.B.=300,000 electron volts) nor penetrate dense opaque packaging materials as are used in the pouch and bag constructions for today's market. Also, UV and IR impart relatively high heat to the materials they radiate whereas EB is a relatively cool process. E.B. curable adhesives require 10 electron volts to "knock out" one electron in the E.B. adhesive essential to start the instantaneous reaction of high speed E.B. curing. Bond strengths of E.B. curable seals are of sufficient strength to be destructive under test to the films or saran (PVDC) coatings on the films or paper substrates. These 100% E.B. reactive adhesives are made by Sun Chemical Co., RAD-CURE CORP. and others.

Further benefits of this novel high speed pouch and bag making method:

(a) The ability to make transverse or across machine direction wide seal patterns on light gage i.e. less than 0.001" and upwards heat sensitive extensible webs such as polyethylene without heat weakening the seal area to a "jelly-like" consistency and without restricting the poly bag or pouch construction to a narrow "side weld[ seal and cut off combination and without a complex web transport mechanism to carry the heat sealed poly web until it cools and regains sufficient tensile strength to resist normal machine web tensions. This is due to the E.B. curing taking place at a temperature below the softening point of extensible webs such as polyethylene, (b) The E.B. cured seals do not require a special oxygen free curing environment as all the seals are buried between the substrates at the sealing interface where air is automatically excluded. Also, the E.B. curable adhesive is applied to one surface of a web before folding upon itself or coming in contact with a second web and the fluid state of the uncured adhesive pattern allows movement of one web relative to the other to avoid tension or guidance wrinkles and the lack of heat in the instant E.B. cure precludes the forming of heat or shrinkage wrinkles and obviates the necessity of cooling jaws or rolls as in most conventional heat seal pouch and bag machines.

(c) The ability to bond predetermined seal patterns between web materials while in motion at high web speeds up to and exceeding 600 ft. per min. to make:

pouches, flat bags and square bottom bags of various paper, film and foil web materials as used in the flexible packaging industry in single ply or in multiply webs.

pouches or flat bags from two webs of similar or dissimilar web materials with outputs up to and exceeding 5000 per minute.

pouches or flat bags from only one web of material without the folding per se of the web with outputs up to and exceeding 5000 per minute.

square bottom bags with straight cut open tops or with integral top carrying handles, E.G. a polyethylene "T-Shirt" type grocery bag.

(d) The rapid rate of the free radical initiated polymerization or cure prevents weak pouch or bag seals on porous paper substrates by effecting the cure instantly and before a significant percentage of the adhesive is absorbed into the substrate and weakening the interface seal, (e) ENERGY CONSERVATION—In this method of high speed pouch and bag making multiple seals at different ply levels can be made simultaneously with a single E.B. exposure as opposed to conventional pouch and bag machines using conduction heated high temperature heater bars in a series of heat sealing stations. These heat sealing heater bars have a high heat loss whereas approximately 90% of the E.B. radiation enters the product. The energy saving is greater when E.B. seals are compared to conventional pouch and bag machine heat seals on solvent or water based adhesives applied in line or off line which adhesives must pass through a thermal dryer to remove the solvent or water prior to heat sealing with a hot sealer bar. If 100% solids thermoseal adhesives are applied in-line or off-line for subsequent conduction made heat sealing, high energy input with inherent high heat losses are incurred in melting the adhesive, heating the applicator rolls and adhesive pan. Typical energy values of thermal dry/cure latex are 2745 BTU per pound, and electron cure 100% reactive adhesive are 2 megarads or 10 BTU per pound.

(f) NON POLLUTING: Chemical and thermal—the noxious polyethylene vapours emitted by a polyethylene side-weld bag machine are well known to those familiar with the present state of the art. In this high speed pouch and bag making method the E.B. seals are made well below the vapour generating temperatures. The E.B. 100% reactive adhesives are solvent free and therefore do not emit hydrocarbons to the atmosphere as solvent base and 100% hot melt adhesives emit in thermal drying and hot melt application.

BRIEF DESCRIPTION OF THE DRAWINGS

The invention will be more clearly understood after reference to the following detailed specification read in conjunction with the drawings wherein:

FIG. 3 is a pictorial view of an alternative form of seal line which may be employed in the manufacture of a pouch;

FIG. 4 is a diagrammatic side view of a pouch making machine in line with a high speed printing machine suitable for use in manufacturing pouches or bags according to the method of the present invention;

FIG. 5 is a diagrammatic representation of a section through a multi-layer web illustrating the straticulate location of different seal lines or areas for simultaneous E.B. curing;

FIG. 6 is a pictorial view of a web passing through a rotogravure device illustrating a web pattern suitable for forming a square bottom bag;

FIG. 7a diagramatically illustrates the manner in which a single web is coated and folded prior to E.B. cure/sealing and transverse cutting off individual pouches or bags from the sealed web;

FIG. 14 illustrates the development of a single web into printed square bottom bags with side gusset fin seams turned inside the bag and with a straight cut top opening.

FIG. 14a is a schematic of the folds created in the apparatus of FIG. 14.

DESCRIPTION OF THE PREFERRED EMBODIMENT

Figures 1, 2:
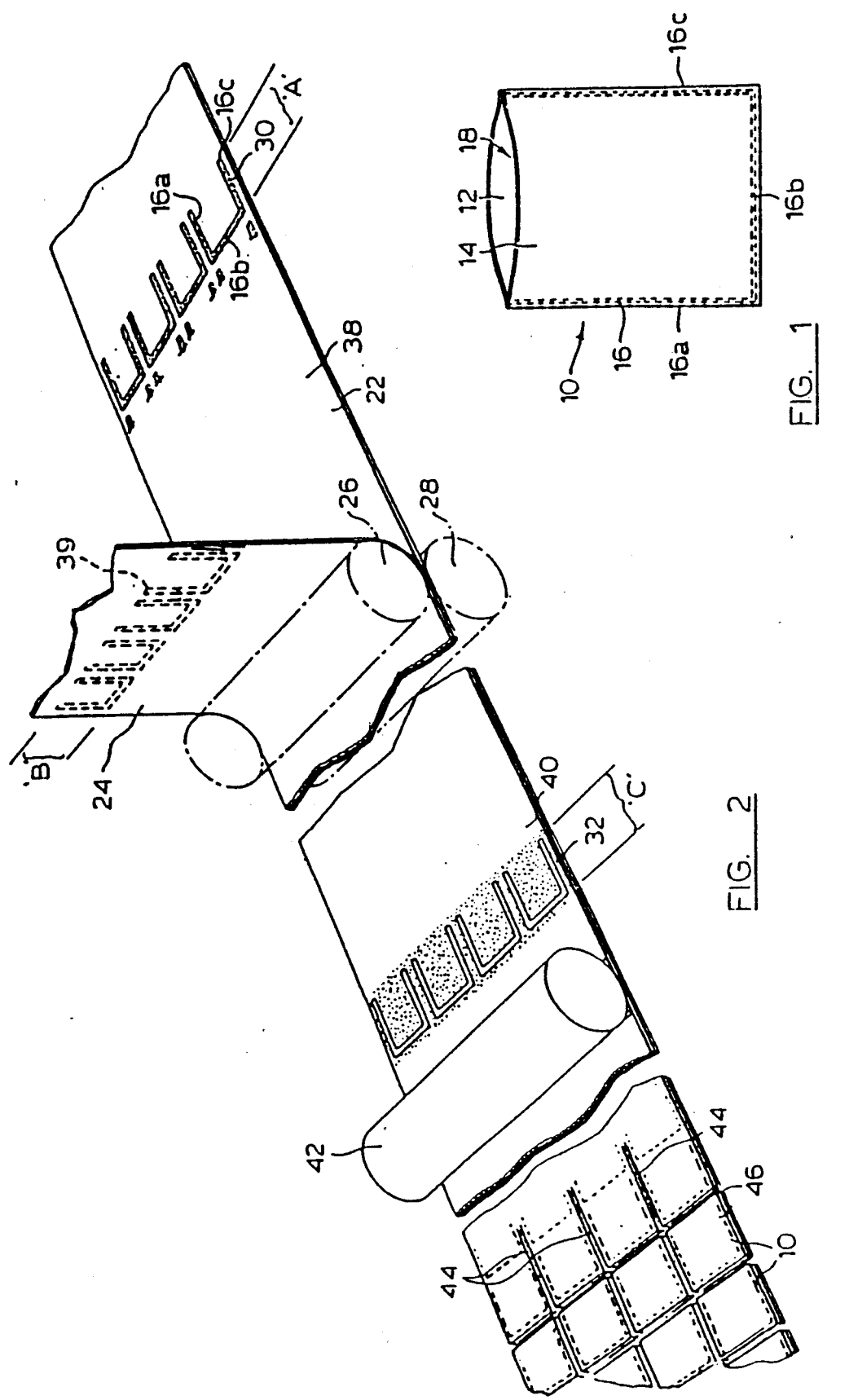
FIG. 1 is a pictorial view of a typical pouch which may be manufactured by the method of the present invention.
FIG. 2 is a diagrammatic illustration of a number of alternative methods of coating a pair of webs for producing a pouch according to FIG. 1.

With reference to the drawings, the reference numeral 10 refers generally to a pouch which consists of a first panel 12 and a second panel 14 arranged in a face-to-face relationship and bonded to one another at an interface thereof along seal lines 16a, 16b and 16c.

The seal lines 16a, 16b and 16c represents the bonded areas of the two panels and are hereinafter collectively identified by the reference numeral 16. The unbonded area located within the bonded areas 16 serves to form an article receiving pouch 18.

It will be understood that the pouch may be in a form of a plastic bag or any other article receiving container and, as will be described hereinafter, the sealing method of the present invention may be used to secure webs at localized areas for the production of a wide range of items not necessarily in the form of pouches or containers.

With reference to FIG. 2 of the drawings, it will be seen that a first web 22 and a second web 24 are guided into a face-to-face overlying relationship with respect to one another between a pair of rollers 26 and 28.

The webs 22 and 24 may be made from a material which is bondable when subjected to electron radiation or from material which is non-bondable when subjected to electron radiation. In either case, a coating is applied to at least one surface of one web so that the bonding characteristics of the coated area of the web are opposite to those of the non-coated area. The coating may serve to make the coated area bondable or it may serve as a screen or resist coating to make an otherwise bondable material non-bondable. Examples of a suitable non-bondable web are paper, aluminum foil and cellophane.

Examples of a suitable bondable material available in web form are polyethylene and polypropylene which are capable of forming a fusion bond but which are more efficiently bondable using E.B. curable adhesive.

Typical E.B. bondable pouch and bag flexible packaging single ply web materials are:

| Web Materials | Density lbs/cu.inch | Thickness inches |
| --- | --- | --- |
| Paper | 0.031 | 0.001–0.004 |
| Cellulose Film | 0.051 | <0.001–0.002 |
| Polyethylene (PE) | 0.033 | <0.001–0.004 |
| Polypropylene (PP) | 0.032 | <0.001–0.002 |
| Polyester (PET) | 0.050 | <0.001–0.002 |
| Polyamide (Nylon,PA) | 0.041 | <0.001–0.004 |
| Polyvinyldiene Chloride (PVDC) | 0.036 | <0.001–0.003 |
| Aluminum Foil (AL) | 0.097 | <0.001–0.002 |

Some of the above webs for a secure bond with the E.B. adhesive, E.G. Polyethylene, require a corona discharge surface treatment which can be done in line up stream of the E.B. adhesive applicator units.

Single ply webs are also used in multiply form as laminated, coextruded or coated. A typical coated web is, PVDC/Paper.

Typical multiply webs, to a maximum 0.008" thickness are: PE/Paper, PE/Cellulose Film, PE/PP, AL/Paper, PE/PA, Paper/PE/AL, PE/PET, PA/AL/PE, Paper/PE/AL/PE, PET/AL/PP, PET/PVDC/PP.

Such webs, single ply or multiply, can be electron radiation pattern bonded in EB 100% reactive and curable adhesive with adhesive laydown weights of 2 to 3 lbs. per 3000 square foot ream and an electron beam radiation dose of 2 to 3 megarads, which penetrates the top web and depth of adhesive to instantly cure the E.B. adhesive patterns which bond the pouch or bag walls together in their predetermined seal patterns. Electron penetration is a function of the "ELECTROCURTAIN ™" controlled electron acceleration voltage, 3.00 KV Max, and the density of materials. Dose is a function of the "ELECTROCURTAIN ™" controlled current output in milliamperes per inch of web width and the web speed.

E.B. curable adhesives and coatings, suitable for forming a bond are available from a number of suppliers such as Sun Chemical Co., Polymer Industries, Rad-Cure Corporation, Dow Corning Corporation and Celanese Chemical Company. Relatively recent developments have produced 100% reactive adhesives and coatings of various monomers and oligomers designed for viscosities (below 200 centipoise) suitable for rotogravure application and polymerization or curing by electron beam radiation. A variety of suitable E.B. curable adhesives are known to those skilled in the art. Coating materials suitable for E.B. radiation screening purposes are metallic or high denisty coatings having substantial resistance to E.B. transmission, and may be applied by rotogravure process to provide variations in pouch and bag making fusion seals.

With reference to FIG. 2 of the drawings, three alternative methods of coating are illustrated at areas A, B and C, respectively. In area A the coating 30 is a coating of bondable material; in area B the coating 32 is a coating of non-bondable material, and in area C the coating 32 is again a coating of non-bondable material. The coating in area A and area B are applied by either of the rotogravure printing cylinders 34 and 35 (FIG. 4) and the coating in area C is applied by a rotogravure printing cylinder 36 (FIG. 4). The coating applied in Area A is applied to a first surface 38 of the first web 22 which is located at the interface between webs 22 and 24 when the webs are brought together between rollers 26 and 28. The coating at area B is applied to a lower surface 39 of web 24 which is again located at the interface of web 22 and 24 when the webs are brought together. The coating 32 applied in area C is applied to an upper surface 40 of web 24.

When bondable coating is applied as indicated in area A, it is applied to an interface surface in a pattern corresponding to the seal line 16a, 16b and 16c. This pattern is applied by the rotogravure printing device with a plurality of printed areas arranged side by side and closely following one another on the surface 38. The web 22 with the pattern of area A applied thereto at longitudinal intervals along the length thereof is located in a face-to-face relationship with the web 24 between the rollers 26 and 28. It will be noted that it is only necessary to apply a pattern as E.B. curable material to one of the webs so that there is no difficulty in aligning the webs 22 and 24. The webs then pass through a radiation curing device 42 which activates the bondable coating 30 to form a bond at the coated interface. The web is then slit longitudinally along slit lines 44 and cut off along transverse lines 46 to sever the individual pouches 10 from the continous web.

When the webs are made from bondable material and the coating is a screening material as illustrated in section B, the coating is again applied by the rotogravure cylinders 34 or 36 and the webs 22 and 24 are located in a face-to-face relationship between rollers 26 and 28 and the composite web is driven through the radiation curtain of the electron beam emitting device 42. In this instance, the coating 32 screens the areas of the interface to which it is applied so that fusion bonding can only occur at the unscreened portions of the interface.

A screen coating may be applied by the rotogravure 36 to the upper surface of the upper web 24 in order to prevent bonding of otherwise bondable webs as previously described. When the rotogravure cylinder 36 (FIG. 4) is used, it is not necessary to use the rotogravure cylinder 34 and it is not necessary to apply any coating to the interface. This method results in a pouch or bag with no coating or adhesive on the pouch or bag interior surfaces which coatings or adhesives or their components can contact or migrate into the subsequent pouch or bag contents when the contents are degradeable by the coating or adhesive or components thereof It will, of course, be understood that when the rotogravure cylinder 34 is used to apply a coating to the interface, it is not necessary to apply a coating to the upper face of web 24. When the coating is applied to the upper face of the web 24, as shown at C in FIG. 2, it may be applied after the webs 22 and 24 are located in a face-to-face relationship. It will, however, be understood that the coating may be also applied before the webs are located in a face-to-face relationship. The coating serves to screen or mask the otherwise bondable areas of the webs at the sealing interface as the web moves through the radiation curtain so that bonding occurs only at the unscreened interface and the pouch is made with no coating or adhesive on either of the pouch interior surfaces adjacent to the contents of the pouch. Again, the web may be slit and cut-off as previously described.

Several forms of a suitable apparatus for high speed pouch and bag making are illustrated in FIG. 4 of the drawings. A simple pouch machine is illustrated in area D of FIG. 4 and a multi-colour printing machine is illustrated at area E in line with the high speed pouch and bag making machine.

With reference to FIG. 4, the reference numeral 50 refers generally to a high speed pouch and bag making machine according to one embodiment of the present invention and the reference numeral 52 refers generally to a multi-colour printing machine.

The high speed pouch and bag making machine includes a first unwinding reel 54 and a second unwinding reel 56. The web 22 is unwound from a roll of material supported on the first unwinding reel 54 and the web 24 is unwound from the roll of web material supported on the second unwinding reel 56. A pair of pull rollers 58 pull the web 22 off reel 54 and a pair of pull rollers 60 pull the web 22 off reel 54 and a pair of pull rollers 60 pull the web 24 off reel 56. A rotogravure cylinder 34 of a rotogravure printing device 62 applies an adhesive of the type previously described, as being applied to area A of the web 22 (FIG. 2). The webs 22 and 24 are brought together at rollers 26 and 28 with the adhesive applied to the interface. The webs 22 and 24 pass through an electron beam radiation device 42 in which a bond is formed at the interface as previously described. The bonded webs are then longitudinally slit by slitting cutters 64 and transversely cut off by rotary knife 66. The individual products are then stacked by means of a stacker mechanism generally identified by the reference numeral 68.

As previously indicated, the high speed of operation of the "Electrocurtain" electron beam radiation device is compatible with the speed of operation of a multi-colour printing press. Consequently, a multi-colour printing press may be arranged in line with the high speed pouch and bag machine previously described, in which case the web 24 is unwound from a reel 70 through any required number of printing press colour units 72 before being directed to rotogravure cylinder 35 or 36 (FIG. 4) depending upon whether the coating is to be an E.B. curable adhesive or a resist coating.

When the process of the present invention is to be combined with a multi-colour printing operation, it is desirable to apply the E.B. curable adhesive or the resist coating to the same web to which the printing is applied so that accurate registration of the printed material and the coating may be achieved with ease. In FIG. 4 of the drawings, two rotogravure printing units 35 and 36 are provided for use in applying the coating of the present invention. When the coating is to be applied to a surface, of a printed web, which will ultimately be located at the interface, it is applied by the rotogravure cylinder 35. When the coating is to be applied to a surface of a printed web, which will ultimately form an upper surface of the webs when they are brought together, it is applied by the rotogravure cylinder 36.

The rotogravure printing unit 35 complete with a dryer may be used to apply a resist coating or an EB curable adhesive, the dryer being necessary only for the resist coating. The rotogravure printing unit 36 complete with a dryer is required only when a resist coating is required on an outside face of a printed or plain (unprinted) pouch or bag. Should the resist coating interfere with the printing then the standard reverse mode of the printing press colour units is employed via web path 72R and the resist coating applied to web 22 from unwind 56 via web path 22B and the resist coating on web 22 is adjacent to the incident EB radiation when webs 22 and 24 are extended from rollers 26 and 28. When the rotogravure cylinder 35 is used to apply a coating to a face which will ultimately be located at the interface, unwind 56 supplies web 22 which is extended into contact with the coated side of web 24 via web path 22a prior to the coated side of web 24 contacting web rolls and to ensure that the coated face is located at the interface when the webs 22 and 24 are directed to the rollers 26 and 28.

As will be described hereinafter with reference to FIGS. 6 to 11 the pouch may be made from a single web of plastic material which is folded upon itself. In the embodiment illustrated in FIG. 4, the method is achieved by passing the web through a suitable web folding device 25 and then directing the web to the radiation curing device 42. The folding device may be any suitable folding former capable of making the folds required in FIGS. 6 to 11 or the like.

From the foregoing it will be apparent that the present invention provides a simple and efficient method of high speed pouch and bag making which is readily applicable to the manufacture of products made from roll stock and secured along spaced seam lines. The method and apparatus is capable of operating at high speeds comparable to those of colour printing press units so that the apparatus may be located in line with a multi-colour printing press.

A rotogravure printing device is particularly suitable for use in applying the coating to the interface. As is common practice with a rotogravure printing device, the lay down weight of the coating may be determined by the controlled micron engraving depth of the printing roller and as applied to the coating of a bondable material in the present invention, the lay down weight may be such that the bond which is achieved is permanent or peelable. In addition, local areas of the lay down pattern can be of a different lay down weight to that of other areas so that the bond may be permanent in such areas and peelable in other areas, a peelable bond being provided in areas where easy opening of a package may be required with a permanent bond being provided in other areas where a peelable bond must be avoided.

As diagrammatically illustrated in FIG. 5 of the drawings, the composite web which is directed through the E.B. radiation device 42 may consist of layers 80, 82, 84 and 86 having interfaces 88, 90 and 92. E.B. radiation curable coatings 88a, 90a and 92a may be applied to the interfaces 88, 90 and 92 respectively, so that the coated portions of the various interfaces are simultaneously bonded on passage through the E.B. radiation device, while the uncoated portions remain unbonded. Thus, it will be seen that the present invention provides a method whereby selective interface sealing of a multiple stack of interfaces may be achieved. It will be noted in some instances, the coated areas of one layer overlap the coated areas of another layer, this, however, does not prevent the bonding of the interfaces at both levels.

A practical example of selective interface coating of a multi-layer web is described hereinafter as applied to the high speed manufacture of a square bottom bag.

With reference to FIG. 6 of the drawings, the reference numeral 100 refers generally to a web of material suitable for use in the manufacture of bags such as coffee bags, air sickness bags and the like. The web may be a web of paper or plastic material or the like. The web is directed through a rotogravure printing device 102 and a coating of E.B. curable adhesive is applied by rotogravure cylinder 104. For the purposes of describing the pattern in which the E.B. curable coating is applied, the gusset fold lines along which the web 100 is subsequently folded are illustrated in broken lines. The gusset fold lines include central gusset fold lines 106 bounded on either side by outer gusset fold lines 108. The E.B. curable coating is applied to a marginal edge portion 110 which extends continuously along one free edge of the web 100 as will be described hereinafter the coating which is applied to the marginal edge portion 110 is subsequently used to provide a longitudinal seal when the web is folded upon itself to form a tubular sleeve.

The bottom wall portion of each bag which is to be formed from the web is a portion located between the broken lines 112 and 114 which extend transversely of the web 100. The rotogravure cylinder 104 applies an E.B. curable adhesive to the portion 116. It will be noted that the E.B. curable portion includes a narrow band extending across the width of the bottom wall former portion in the area of the lower edge 112 and triangular shaped portions 118 projecting upwardly therefrom to the intersection of the gusset fold lines 108 and the bottom fold line 114. It will be noted that an uncoated triangular shaped portion 120 projects downwardly between the triangular portions 118.

Figure 7:
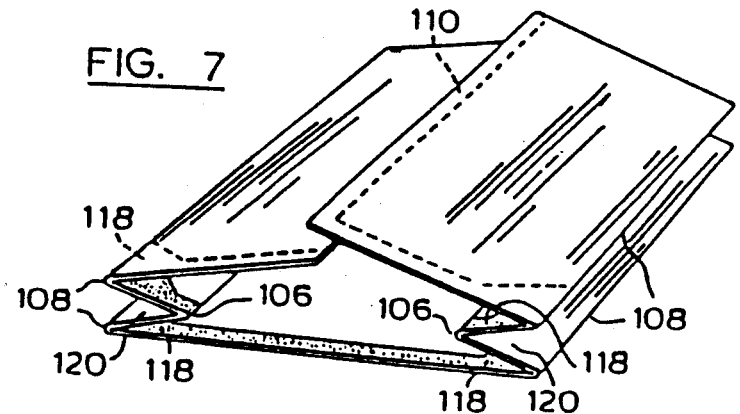
FIG. 7 diagrammatically illustrates the manner in which the web of FIG. 6 is folded to form a tubular sleeve.
Figure 8:
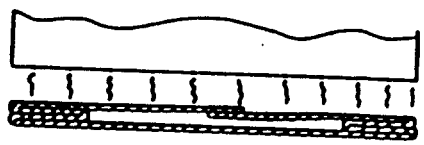
FIG. 8 diagrammatically illustrates the stratification of the various layers of the web of FIG. 7 when subjected to E.B. radiation.

FIG. 7 of the drawings shows the web of FIG. 6 in a partially folded configuration. It will be noted that the central gusset fold line 106 is disposed inwardly from the gusset fold lines 108. The manner in which the multiple interfaces are formed will be apparent with the reference to FIG. 7 of the drawings which also illustrates the location of the various coated portions at preliminary folding. The folding of the web is completed in the relationship indicated in FIG. 7 until the oppositely disposed faces are in intimate contact with one another whereupon the web is directed through an E.B. radiation device as illustrated in FIG. 8 of the drawings The E.B. radiation device causes curing of the E.B. curable material as the web passes therethrough so that a permanent bond is formed at each of the E.B. curable coated interfaces while the uncoated interfaces remain unbonded.

After E.B. radiation the individual bags are cut from the continuous web by severing along the line spaced below the level of the transverse coating 112 so that the bag is preferably cut along an unsealed area so that in forming the transverse cut, the open end of the bag is formed. Referring back to FIG. 7 of the drawings, it will be noted that the uncoated triangular areas 120 are located between the coated areas 118. As previously indicated with reference to FIG. 5 of the drawings, E.B. radiation of this structure will provide a bond at the coated areas while leaving the uncoated areas unbonded. The unbonded triangular portions 120 are important when it comes to the erection of the bag to form a square bottom. The unbonded portions 120 in combination with the bonded portions 118 cause the bottom wall forming portions of the bag to articulate along the boundary lines 124 and transverse hinge line 114 to form a square bottom bag.

Figure 9:
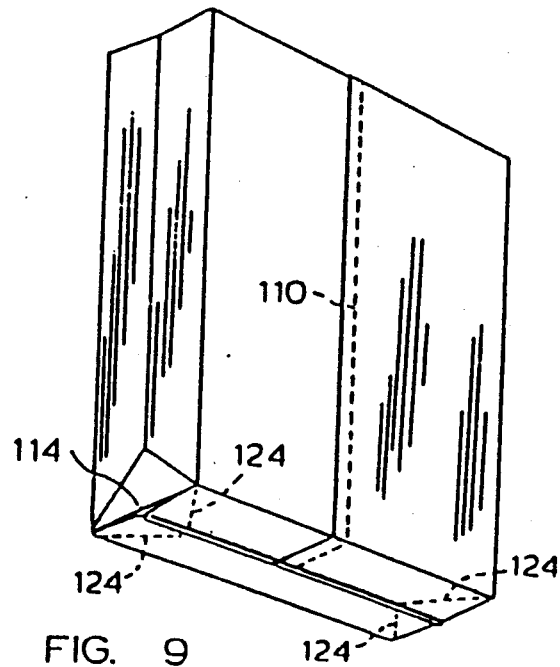
FIG. 9 is a pictorial view illustrating a square bottom bag constructed from the web of FIG. 6.
Figure 9A:
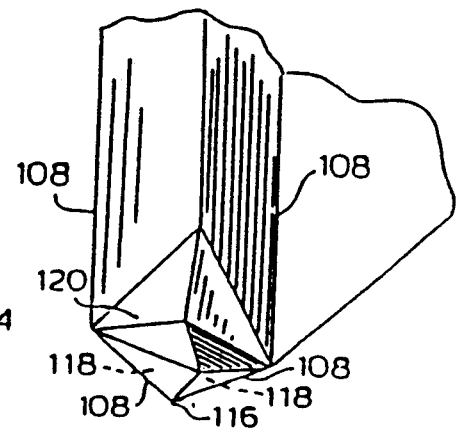
FIG. 9a is an enlarged detail view illustrating the construction of one corner of the square bottom bag of FIG. 9.

FIG. 9a shows an interim stage in the erection of a bag in which it will be seen that the out gusset fold lines 108 extend across the bottom of the bag and the coated portions 118 on either side thereof are bonded together to form a double thickness The uncoated triangular area 120 being free from attachment with respect to the remainder of the bottom wall so as to permit articulation of the various panels to the required square bottom configuration.

Various other printing devices may be used for applying the required coating to the web. For example, the coating may be applied by flexographic or letter press printing systems with various degrees of efficiency.

As previously indicated while the present invention is particularly suitable for use in the high speed manufacture of pouches or bags or the like, the method and apparatus may be used for the manufacture of any number of pattern bonded structures. For example, in FIG. 3 of the drawings, a tinted coating is applied in the form of a pattern 90 to one transparent web so that after radiation bonding the coated area is bonded while the adjacent areas of the web are unbonded. As a result the bonded areas become clearly visible. The pattern 90 may be in the form of a date, code, trade mark or advertising material. When a pouch or the like is to be manufactured as described in FIGS. 1 and 2, the pattern 90 may be in the form of a continuous script extending around the area which will form the seal lines 16a, 16b and 16c of the pouch of FIG. 1. Thus it will be seen that in the forming of a seal line, the pattern established by the pattern bonding may itself be used to convey a message relating to the package or its contents.

FIG. 7a illustrates the manner in which a satchel type squared bottom bag can be made by the application of an E.B. bondable coating to selected portions thereof.

In this embodiment a web is folded along longitudinal extending fold lines 113 and 115 in order to form an inwardly directed gusset. By the application of a bondable coating in the manner previously described an E.B. bondable coating is applied to the areas 117 and to the triangular shaped area 119 and circular areas 123 at corner 121. It will be noted that in the corner 121, the bondable coating is applied to each of circular areas 123 while in the coated area 119 the bondable coating is applied to the triangular corner section with circular areas 121a being free of bondable coating. It will be understood that a pattern of E.B. bondable material will be applied to each corner forming portion of the web. Thus, when the web is folded to locate the inner faces in a face-to-face relationship and the web is passed through the E.B. radiation device, a bond is formed about the periphery of the bag forming portion of the web and thereafter the web is served along the line 125 to separate one bag from the web. It will be noted that the uncoated areas 121a will be located directly opposite the coated areas 123 when the web is folded to a lay-flat configuration prior to E.B. radiation. Similarly it will be noted that the uncoated area at corner 121 will be located directly opposite the coated area 119. Thus, the radiation is able to pass substantially unrestricted through the uncoated areas to the underlying coated areas so that a bond of substantially the same strength may be formed at the coated areas of each interface without requiring any substantially greater power than that required to form the required bond at one interface. In this embodiment, the uncoated areas serve to permit the substantially free passage of the E.B. radiation therethrough. Thus, it will be seen that the method of pattern bonding may be such as to provide a discontinuous coating at one interface so that the radiation may pass therethrough to form a bond at an underlying coated interface.

Figure 10:
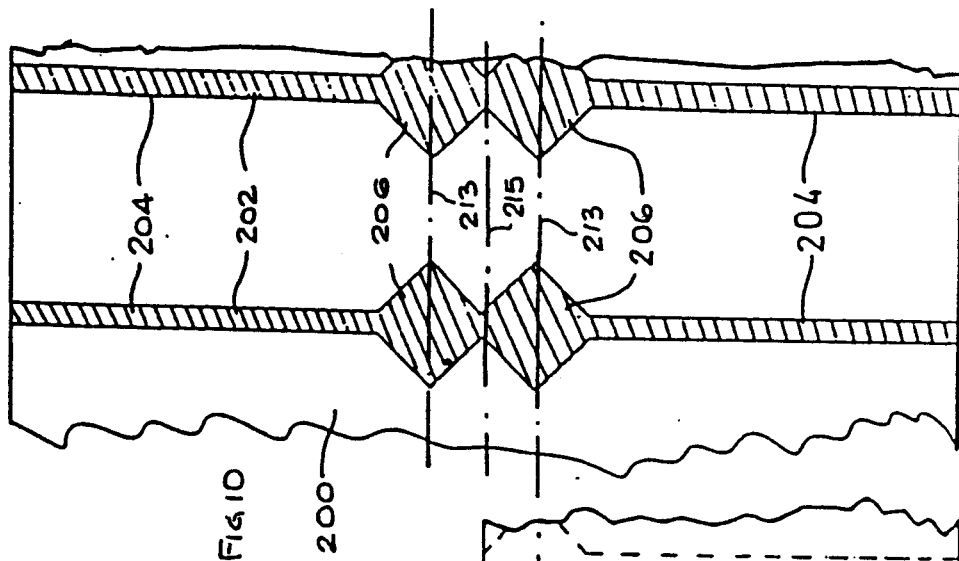
FIG. 10 is a plan view of a coated web showing a coating pattern suitable for forming a satchel type square bottom bag.
Figure 10A:
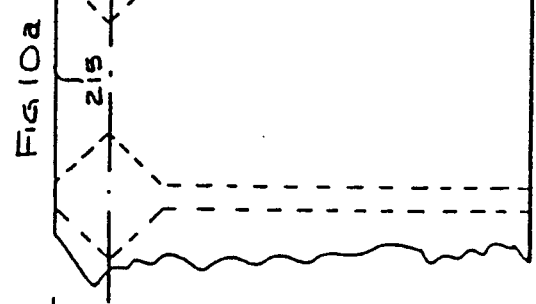
FIG. 10a shows a first fold along a central gusset fold line.
Figure 10B:
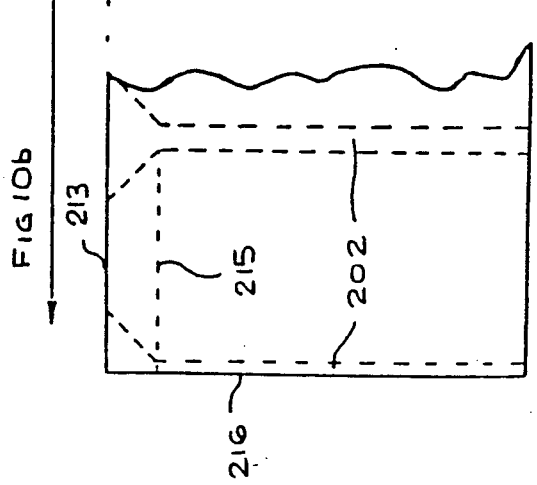
FIG. 10b shows a second fold in which the central gusset fold line is folded inwardly.
Figure 11:
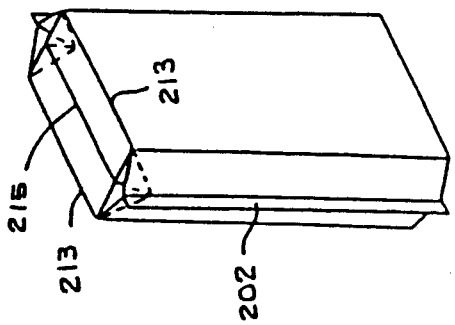
FIG. 11 is a pictorial view of the bag formed from the web of FIGS. 10, 10a and 10b.

FIGS. 10, 10a and 10b, illustrate a further pattern suitable for use in the manufacture of a satchel type square bottom bag. In this embodiment, the bondable coating is applied in the manner previously described to a web 200 along transversely extending longitudinally spaced areas 202. Each area 202 consists of a longitudianl seam forming portion 204 and a pair of generally diamond shaped corner portions 206. The diamond shaped portions 206 are centered on fold lines 213 and meet one another at the gusset fold line 215. As shown in FIG. 10, the web 200 is initially folded along the gusset fold line 215 and as shown in FIG. 10a the web is subsequently folded along the fold lines 213 to locate the gusset fold line 215 inwardly thereof. The web is irradiated when in the folded position shown in FIG. 10b to bond the bondable areas and the web is cut along the transverse cut line 216 which extends centrally of the width of the coated areas 202. The bag formed by this method is illustrated in FIG. 11 of the drawings.

A pouch, such as a retort pouch, may be made by the method of the present invention in which one or more of the webs is formed from a laminate consisting of Polyester, aluminum foil, and polypropylene (PET-/AL/PP) or PET/PVDC/PP.

Figure 12:
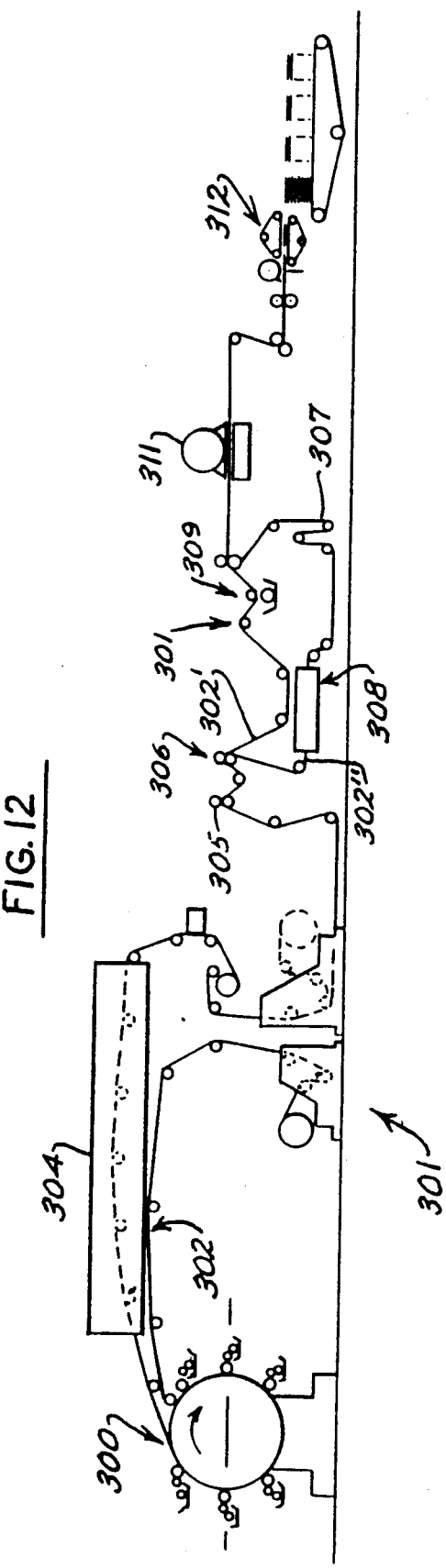
FIG. 12 is a diagramatic side elevation of a flexographic printing press in tandem with an electron radiation pouch and bag machine illustrating the web path for making flat printed pouches and bags from a single web of material.

With specific reference to FIGS. 12-16, two alternate embodiments of the present invention are described in greater detail. With reference to FIG. 12, a modern six color central impression flexographic printing press 300 is shown as being in line with the electron radiation pouch and bag making machine 301 in an arrangement such that the printing press may operate either in line with the radiation pouch and bag making machine or in its normal roll to roll mode. Also, by providing a roll unwind unit the pouch and bag making machine can operate separately from the printing press. However, the in line arrangement disclosed is ideal for the manufacturing of flat printed pouches and flat printed bags with the front panel printing in register to the back panel printing and to the cut off line of the pouch or bag top opening.

Figure 13:
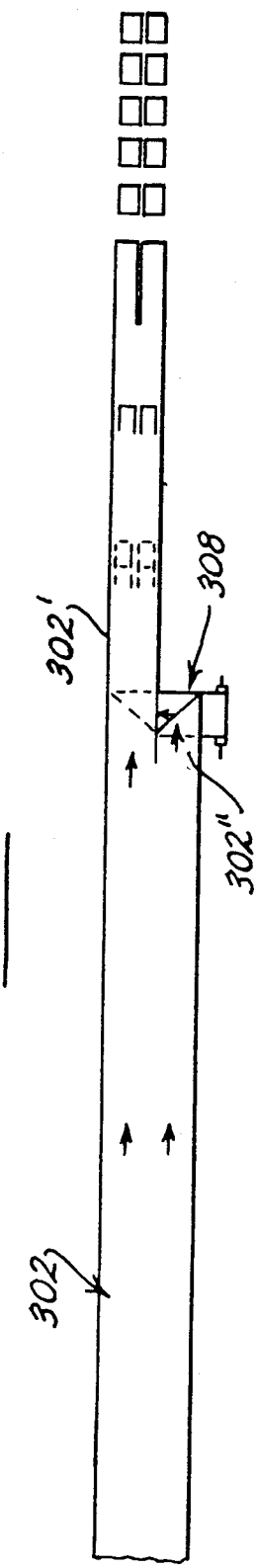
FIG. 13 illustrates the development of flat printed pouches or bags from a single web.

The method and apparatus disclosed in FIG. 12 is designed to operate on a continuous single web from the flexographic printing press with the flow of the single web material being shown in FIG. 13. As disclosed in FIG. 13, a single web 302 is printed while continously flowing through the in line arrangement of the printing press and the bag or pouch forming and curing machine. Once a web flowing through an adhesive applying bag making machine exceeds approximately 36" in web width, it becomes difficult to fold the web in half without smearing adhesive patterns and it also becomes difficult to accurately control the lateral position of the running fold line depending on the web machinability, stiff multiple laminations varying to flimsy 0.001" polyfilm. To overcome these problems of applied fluid E.B. adhesive patterns and subsequent wide web folding, without smearing the applied adhesive patterns, the web folding per se has been eliminated in the embodiment shown in FIGS. 12-14. In the apparatus shown in FIG. 12, the single web material 302 is conducted from a supply roll 303 to the printing press 300 wherein a single or multiples of colors and indicia may be printed on the upper surface of the material. The ink applied to the material is thereafter dried by passing through drying chamber 304 after which the material is pulled through a pair of pull rolls 305. As will be seen from FIG. 13, the material arriving at the pull rolls 305 is a single width of web material which has printing applied across the entire upper face thereof as is necessary. After the material leaves the pull rolls 305, it passes through a slitter assembly 306 wherein the web is slit or cut into equal width longitudinal sections or first and second webs 302' and 302". The web 302" which is to form the back panel of a bag or pouch is conveyed through a web turn over, alignment and collating device 308 and print register compensator device 307 where the web is collated under the other web 302' which will form the front panel of the bag or pouch. The front panel web 302' passes through a rotogravure adhesive applicator 309 wherein a 100% E.B. reactive and curable adhesive is applied to the lower surface of the web. The adhesive pattern applied to the lower surface of the upper web 302' is applied so as to be in register to the printing on the upper surface of the web while the outer surface of the lower web 302" is being brought into register with the upper web printing by the compensator device 307.

After the 100% E.B. adhesive has been applied to the upper web, the upper and lower webs are brought together through a pair of combining rollers 310 so that the pattern of adhesive is sandwiched between the upper and lower webs. The two webs which are combined are thereafter passed through an electron radiation device 311, such as the "ELECTROCURTAIN" wherein the adhesive pattern previously described, is subjected to instantaneous curing by the free radical initiating electron radiation emitted from the device.

Once the adhesive pattern between the webs has been cured, the combined webs are ready to be slit into separate streams of pouches prior to cut off of single pouches or perforated laterally and wound into rolls of pouches which are connected by preforated (tear off)

connections between the opening of one pouch or bag and the sealed lower edge of the adjacent pouch or bag by by-passing the cutting and stacking assembly 312 to enter a roll rewind unit.

As shown in FIG. 13, the radiation pouch and bag machine 301 is working with web widths which are nominally only one half of the widths of the web passing through the printing press. Therefore, an "ELECTROCURTAIN" for creating a 48" long radiation zone within the radiation curing unit 311 need only be 48" long in order to accomodate a printed web of up to 96" wide to produce multi-streams of pouches or bags that are printed on both sides. By way of example, two streams of department store flat printed bags, size 18" wide by 30" deep, are produced from a single 72" wide web of 0.001" gage polypropylene or high density polyethylene printed at web speeds of up to and exceeding 600' per minute for an output of 480 bags per minute in a one pass operation. For another example, four streams of similar department store bags but in dimension 9" by 18", produced from the same 72" web material under the same conditions will result in an output of 1600 bags per minute in a one pass operation. The bags may be delivered in rolls by the use of a transverse web preforated in lieu of the cut off knife and a roll rewind unit at the cutting and stacking station 312.

Figure 16:
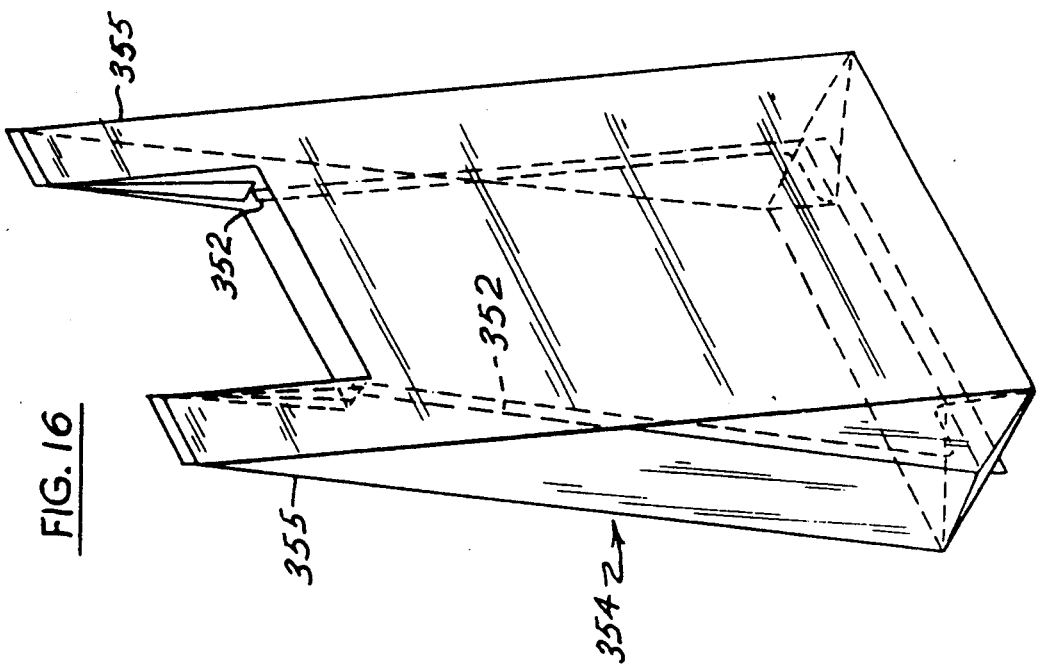
FIG. 16 illustrates a square bottom bag with side gusset fin seams turned inside the bag and with two carrying handles integral with the top opening.
Figure 15:
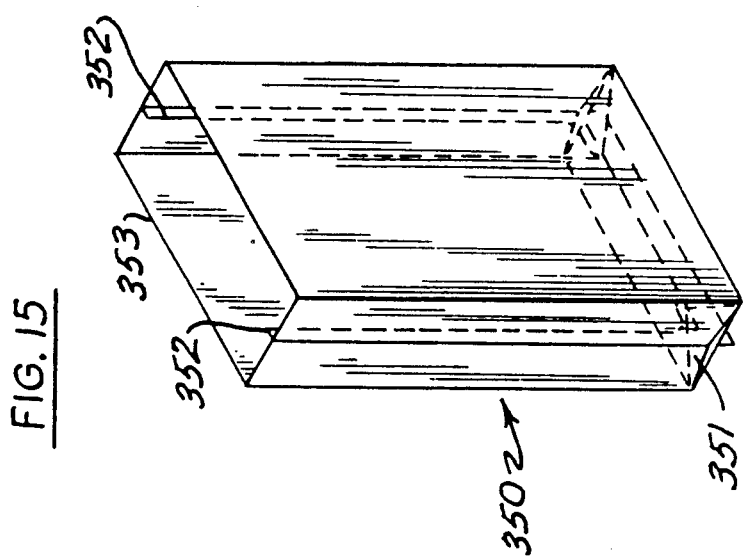
FIG. 15 illustrates a square bottom bag with side gusset fin seams turned inside the bag and with a straight cut top opening.

With reference to FIGS. 12a and 14–16 of the drawings, an apparatus for forming printed square bottom bags 350 in which the bags include side gussets 351 each having a center fold fin seam 352 turned inside the bag. FIG. 15 illustrates such a gusset fin seam square bottom bag with a straight cut top opening 353 whereas FIG. 16 illustrates a gusset fin seam square bottom bag 354 having two carrying handles 355 integrally formed with a top opening. The bag disclosed in FIG. 16 when made with a 0.00075" gage polyethylene makes a typical "T-Shirt" grocery bag. FIG. 14 illustrates the web development from a flat single web into the side gusset center fin seam square bottom bag disclosed in FIGS. 15 and 16.

Figure 12A:
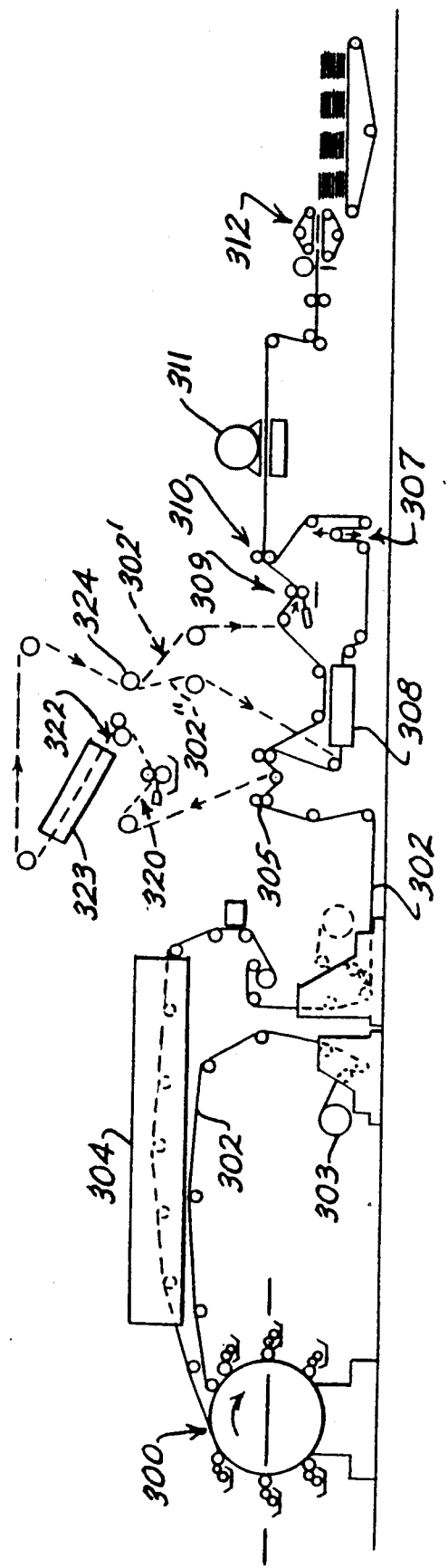
FIG. 12a illustrates the web path for making printed square bottom bags with side gusset fin seams turned inside the bag utilizing a single web material.

The apparatus shown in FIG. 12a is generally similar to the apparatus shown in FIG. 12 with the exception that in order to form the side gussets in the square bottom bags, the web path is modified so as to include an E.B. adhesive applicator which applies the E.B. adhesive to the bottom inside gusset fold by providing four triangular seal patterns across the full web width and in register to the printing on the opposite side of the web. In this embodiment, the single web material 302 which has been printed in the press 300 is fed from the pull rolls 305 to a full web width E.B. adhesive applicator 320 wherein triangular seal patterns are printed on the bottom surface of the web material as is shown in dotted line at 321 in FIG. 14. Thereafter, the single web material is introduced into a web slitter 322 which severs the web longitudinally into first and second web sections 302' and 302". The severed web sections are thereafter passed through a gusset fold over device 323 wherein the opposite edges of each of the first and second web sections which form the top and bottom panels of a bag to be formed are folded as is illustrated in FIGS. 14 and 14a.

After the first and second web sections have been folded along their edges so as to enclose the E.B. adhesive triangular gusset seal patterns under the half gusset fold, the first web section 302' forming the front panel of the bag or pouch to be assembled enters into the E.B. adhesive applicator 309 which is similar to that disclosed in FIG. 12 wherein the E.B. adhesive is applied to the under surface of the web section so that the E.B. adhesive is applied to the two longitudinal side gusset fin seal areas of the bag and along the bottom of the bag traverse to the seal patterns along the longitudinal sides. The back panel formed by the second web section 302" passes from the separating roller 324 into the web turnover and lateral web alignment or web collating device 308 wherein the second web is turned over and moved laterally and brought into underlying relationship with the first web section as is illustrated in FIG. 14. The underlying web thereafter passes through a print register compensating device 307 from which the back or underlying web stream exit in proper underlying relationship with the printing in register to the printing on the upper web prior to the webs being combined by combining rollers 310. After the webs have been brought into register and combined with one another so that the E.B. curable adhesive is now interfaced between the upper and lower web sections, the combined web is passed through the electron radiation chamber 311 wherein the E.B. adhesive seal patterns are cured at 3 strata levels (these being the bottom inside gusset seals, the longitudinal gusset fin seals and the top inside gusset seals). The radiation multi-layered pattern bonded web then enters the rotary cut off unit 312 which severs the bags into individual square bottom bags at a cut off line disposed outwardly from the bag bottom tranverse seal line and thereafter delivers the open mouth square bottom bags in their folded flat attitude to the stacking and delivery conveyor. The width of the adhesive seal patterns applied in the embodiments of the invention shown in FIGS. 12 and 12a are generally similar to those discussed above with respect to the other embodiments of the invention with the maximum being approximately one quarter of an inch in width along any given side or bottom seal line. With the embodiment of FIG. 16, the bag bottom transverse seal is made at least double the normal one quarter inch width to provide a top bag seal and a bottom bag seal by making individual bag cut off lines across the transverse center line of the wide seal. In this manner, square bottom bags are created which are sealed across the top and bottom. Thereafter, in order to create the "T-Shirt" square bottom bag 354 shown in FIG. 16, in a separate off line operation, the top sealed end of the bag is cut with a deep rectangular center section being removed in order to provide the two integral bags side extensions which are each approximately 2" wide and extend upwardly about 6" from the center cut bag opening. These extensions form the two carrying handles 355 of the bag as shown in FIG. 16.

Utilizing the processes disclosed with respect to FIGS. 12 and 12a, it is noted that a single width of thin heat sealable films may be used wherein the films are initially printed along their entire width and thereafter the web or films severed and re-oriented so that the printed half sections or webs of the film are in opposing relationship with a 100% E.B. adhesive pattern being applied between the two webs after which the webs are instantaneously bonded by passing through an electron radiation unit. Speeds at which the bags of the present embodiment of the invention may be made are well in excess of those of conventional pouch and bag making machines with speeds of up 600' per minute being obtainable while forming a plurality of bags or pouches from a single web of material.

Various modifications of the present invention will be apparent to those skilled in the art. For example, it will be apparent that the method of the present invention permits the production of a pouch from webs which are in the form of laminates in which one or more of the webs consists of a laminate of a heat sealable plastic material and an aluminum foil or a heat sealable plastic material and paper or the like. It will also be apparent that the method of the present invention permits a seal to be formed between the bondable webs at temperatures below the heat sealing temperature of the thermoplastic film used to form one or other of the webs. The method of the present invention also permits the production of a pouch in which the seal areas which are coated with bondable material constitute up to 50% of the total pouch face area. Preferably, each web from which the pouch is made has a thickness which does not exceed 0.008".

I claim:

1. An apparatus for forming an open bag from thin gage heat sensitive web materials of thickness gages up to approximately 0.008" and at temperatures below the heat sealing temperature of a 0.001" gauge thickness film of polyethylene comprising:
    (a) means for continuously pulling a single web of material through said apparatus at rates of up to at least 300' per minute,
    (b) at least one printing press arranged in line with said single web for applying ink printing to a first surface of said single web as it passes therethrough,
    (c) a film slitter for cutting said single web into first and second webs,
    (d) a primary rotogravure coating means arranged in line with said first web for applying a sealing line pattern of 100% E.B. reactive and curable adhesive to a second surface of said first web, said sealing line pattern being in register with the ink printing applied to said first surface, to thereby render the first and second webs bondable in a configuration of the sealing line pattern,
    (e) re-orienting and collating means for collating said first and second webs in an overlying relationship with said second surface of said first web in intimate contact with the second surface of the second web so to interpose the sealing line pattern at the interface of the first and second webs,
    (f) electron beam curing means arranged in line with the collated webs, said electron beam curing means having a curing station and being operable to emit a curtain of electron radiation perpendicular to and across the full width of said collated webs and having energy for initiating a free-radical polymerization directly and instantly of said sealing line pattern of 100% E.B. reactive and curable adhesive and without the application of heat and at temperatures of the first and second webs below the sealing temperature of a 0.001" polyethylene,
    (g) pulling means for moving said intimate contacting first and second webs in a single path through said curing station whereby said curtain of electron radiation irradiates the total area of said sealing line pattern of 100% E.B. reactive and curable adhesive to cure said 100% E.B. reactive and curable adhesive and thereby substantially instantaneously bond said first and second webs together along said sealing line pattern,
    (h) cutting means arranged in line with the bonded first and second webs for cutting said bonded webs while said bonded webs are in continuous motion wherein such cutting is along lines disposed outwardly from said sealing line pattern so as to thereby provide open bags.

2. The apparatus of claim 1 in which said means for continuously pulling a single web through said apparatus, pulls said single web material through said apparatus of rates up to at least 600' per minute.

3. An apparatus for forming an open bag of claim 1 including a preliminary rotogravure coating means arranged in line with said printing press to receive said single web therefrom and to apply a first 100% E.B. reactive and curable adhesive to portions of the second surface of said single web and means for conveying said single web from said preliminary rotogravure coating means to said film slitter.

4. The apparatus for forming an open bag of claim 3 including the additional means of a gusset forming means positioned between said film slitter means and said primary rotogravure coating means, said gusset forming means including means for folding the edges of said first and second webs.

5. A method for continuously printing and forming bags from thin gauge heat sensitive webs of film-like materials including polyethylene films and wherein the films have a thickness gauge in the range of up to 0.008", in which the bags consist of two panels which are secured to one another along sealed lines which extend about an article storage compartment located between the two panels and which are open along an opening line extending between opposite ends of the seal lines, the method comprising the steps of:
    (a) continuously pulling a single web of material through at least one printing press at speeds up to at least 300' per minute and applying printing to a first surface of said single web as it passes through said press;
    (b) slitting said single web into first and second webs;
    (c) continuously pulling said first web of heat sensitive material through a primary rotogravure coating means and applying bag seal line patterns of 100% E.B. reactive and curable adhesive to portions of a second surface of said first web in register with the printing applied to said first surface thereof in order to render the material bondable along the bag seal line patterns;
    (d) continuosly pulling said first and second webs of heat sensitive material at the same speed as that at which said single web is passing through said printing press and collating said first and second webs in an overlying relationship with said second surface of said first web in intimate contact with said second surface of said second web and with said 100% E.B. reactive and curable adhesive therebetween;
    (e) continuously moving said collated first and second webs of heat sensitive material at the same speed as that at which said first and second webs are pulled through said primary rotogravure coating means and said web collater, respectively, in a single pass through an electron beam curing means which emits electron radiation, across the full width of said collated first and second webs, that free-radical initiates polymerization of the 100% E.B. reactive and curable adhesive of said bag seal line patterns to thereby directly and instantly bond said first and second collated webs along said bag seal line patterns without the application of supplemental heat and at web temperatures below the sealing temperature of a 0.001" gage polyethylene film and;

(f) continously moving the bonded first and second webs of material at the same speed as that at which the webs pass through said electron beam curing means through cutting means wherein the webs are cut along lines extending about the line seal paterns with such lines being disposed outwardly from the seal line patterns and extending along said opening line to provide an open bag.

6. The method of claim 5 in which said single web material is selected from one of the group of materials consisting of paper, cellulose, polyethylene, polypropylene, polyester, polyamide, polyvinyldiene chloride and aluminum foil.

7. The method of claim 5 in which said single web material is a laminate selected from two or more of the group of materials consisting of paper, cellulose, polyethylene, polypropylene, polyester, polyamide, polyvinyldiene chloride and aluminum foil.

8. The method of claim 5 in which said single web is conveyed through said printing press at speeds of up to approximately 600' per minute.

9. The method of claim 5 including the additional steps of passing said single web material through a preliminary rotogravure coating means so as to apply a 100% E.B. reactive and curable adhesive to portions of the second surface of said single web which portions of said adhesive correspond to gussets to be formed in the bag and so as to be in register with the ink printing applied to said first surface of said single web, and, after passing said single film through said film slitter to form said first and second webs, passing said first and second webs through a gusset folding apparatus wherein the sides of said first and second webs are folded over the 100% reactive and curable adhesive material applied to said second surface to form said gussets of said bags and thereafter passing said first web to said primary rotogravure coating means while said second web is conveyed to said re-orienting and collating means.

* * * * *